United States Patent [19]

Kosman

[11] 4,378,202

[45] Mar. 29, 1983

[54] DEVICE FOR MOULDING BRICKS

[75] Inventor: Wilhelmus J. M. Kosman, Groesbeek, Netherlands

[73] Assignee: Machinefabriek De Boer B.V., Nijmegen, Netherlands

[21] Appl. No.: 252,265

[22] Filed: Apr. 8, 1981

[30] Foreign Application Priority Data

May 14, 1980 [NL] Netherlands .......................... 8002802

[51] Int. Cl.[3] .................................................. B29F 3/12

[52] U.S. Cl. ....................................... 425/99; 425/112; 425/125; 425/413

[58] Field of Search .................. 425/99, 112, 125, 413

[56] References Cited

U.S. PATENT DOCUMENTS

| | | | |
|---|---|---|---|
| 271,875 | 2/1883 | Le Poidevin | 425/99 |
| 1,597,119 | 8/1926 | Strickland | 425/99 |
| 1,908,640 | 5/1933 | Dunn | 425/99 |
| 3,465,395 | 9/1969 | Cuoliwa | 425/99 |

FOREIGN PATENT DOCUMENTS

| | | | |
|---|---|---|---|
| 11276 | of 1846 | United Kingdom | 425/99 |

*Primary Examiner*—John A. Parrish

*Attorney, Agent, or Firm*—Diller, Ramik & Wight

[57] ABSTRACT

A device for moulding bricks comprising a press to form blanks, moulding trays and projecting means formed by a carrier surface for inverting a blank by moving it along a circular path and for projecting it into a moulding tray wherein the carrier surface is guided in a manner such that it performs a pivotal movement during the movement along the last part of the circular path.

20 Claims, 4 Drawing Figures

DEVICE FOR MOULDING BRICKS

Figure 1:
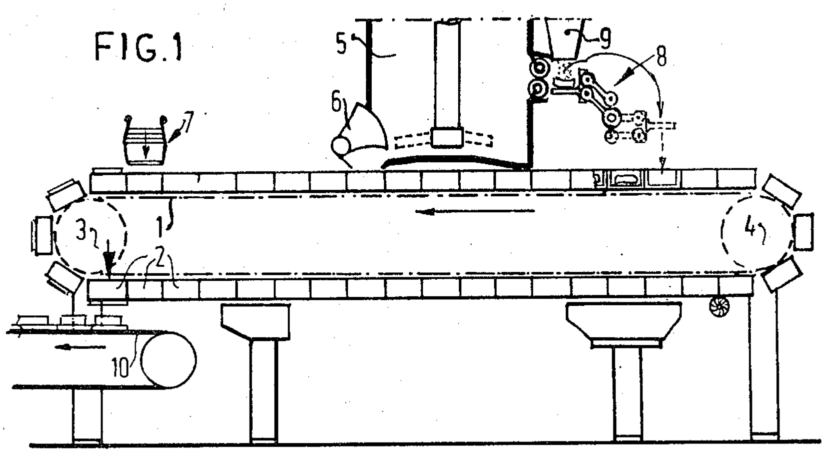

The invention relates to a device for moulding bricks comprising a press to form blanks, moulding trays and projecting means formed by a carrier surface to invert a blank by moving it along a circular path and to project it into a moulding tray.

Such a device is known inter alia from Dutch Pat. Specification No. 161,702. In the known device a batch of clay, after being sanded, is put into the moulding tray by means of a projecting mechanism. Subsequently the moulding tray is filled up with clay under pressure. The projecting mechanism comprises a fork-shaped body moved along the arc of a circle. At a given point of the arc the sanded batch of clay disengages the fork and drops freely in the direction towards the moulding tray. It has been found that particularly in larger systems in which a plurality of forks are mounted on a single shaft, the batches of clay do not get into the subjacent moulding trays. The reasons thereof are not quite clear. The point of the arc of the circle where the clay disengages the fork and starts dropping freely will depend upon the adhesive force of the clay. It is furthermore possible that during the movement along the circular path the clay performs a radial movement along the fork under the action of centrifugal forces as a result of which the radial line of the circular path described is unintentionally enlarged. A reliable operation of the device requires a better control of the movement of the batch of clay. According to the invention, this is achieved by guiding the carrier surface in a manner such that it performs a pivotal movement during the movement along the last part of the circular path. In this way it is ensured that during the last trajectory the blank obtains a substantially perpendicular component of movement in downward direction. The pivotal movement will start at a point of the circular path where the blank has not yet disengaged the carrier surface. In this way the movement of the blank is accurately controlled and the reliability of operation of the device is appreciably enhanced.

Preferably the carrier surface performs a pivotal movement through about 90° out of a horizontal position prior to the movement along the circular path. The blank thus gets into a substantially vertical position. This measure results in that the vector of the centrifugal force extends through the carrier surface so that displacement of the blank along the carrier surface during the circular movement is practically excluded. This results in that the place of the blank on the carrier surface is accurately determined during the last part of the circular path and particularly at the point where the pivotal movement starts. In this way any deviations from the path of movement resulting from a displacement of the blank on the carrier surface are eliminated.

The arc of the circle subtends about 120°.

The guide means for the carrier surface may be formed by a parallelogram-shaped, pivotable rod system, one of the sides of which is connected with a driving mechanism and a further side of which is connected with the carrier surface. In order to perform the projecting movement, first the enclosed acute angle of the parallelogram is enlarged to an obtuse angle, after which the parllelogram is pivoted and finally said obtuse angle is reduced.

In order to terminate the pivotal movement of the carrier surface and to start the circular movement, one of the long sides of the parallelogram may have a stop for the short side so that the pivotal movement automatically changes into a circular movement.

At the end of the path of movement of the parallelogram, a stop is provided so that the movement terminates shock-wise and the blank is ensured to get loose from the superjacent carrier surface. The carrier surface is preferably bounded by an upwardly extending wall in order to support the blank during the circular movement in a substantially horizontal direction.

The invention will be explained with reference to the drawing of one embodiment. The drawing shows in FIG. 1 a schematic survey of the device in accordance with the invention, FIGS. 2 and 3 a detail of FIG. 1 illustrating the operative means according to the invention in different positions and FIG. 4 an embodiment of a plurality of carrier surfaces in parallel disposition and of the associated moving mechanisms.

The endless conveyor 1, which moves around the gear wheels 3 and 4, supports moulding trays 2. From the press 5 the blanks are moved with the aid of the projecting mechanism 8, after being sanded from the reservoir 9, into the moulding trays moving underneath. Subsequently with the aid of the pressing mechanism 6, the trays are filled up with clay under pressure. From the store 7, drying plates are put down on the adjacent moulding trays. Subsequently the drying plates and the blanks are moved to the conveyor 10 and passed to a drying furnace.

Figure 2:
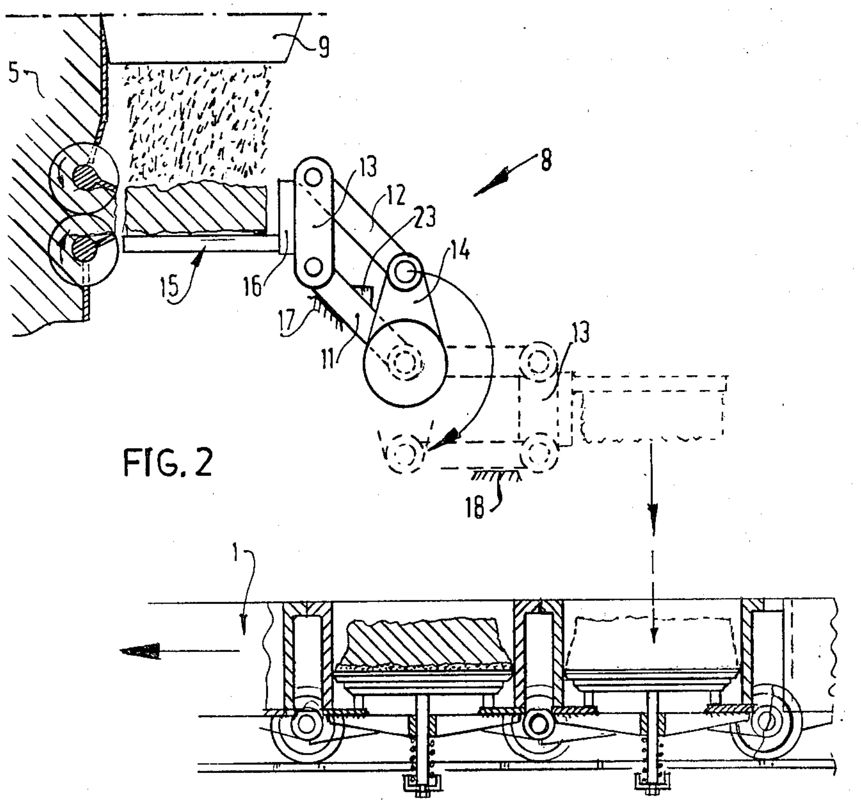
Figure 3:
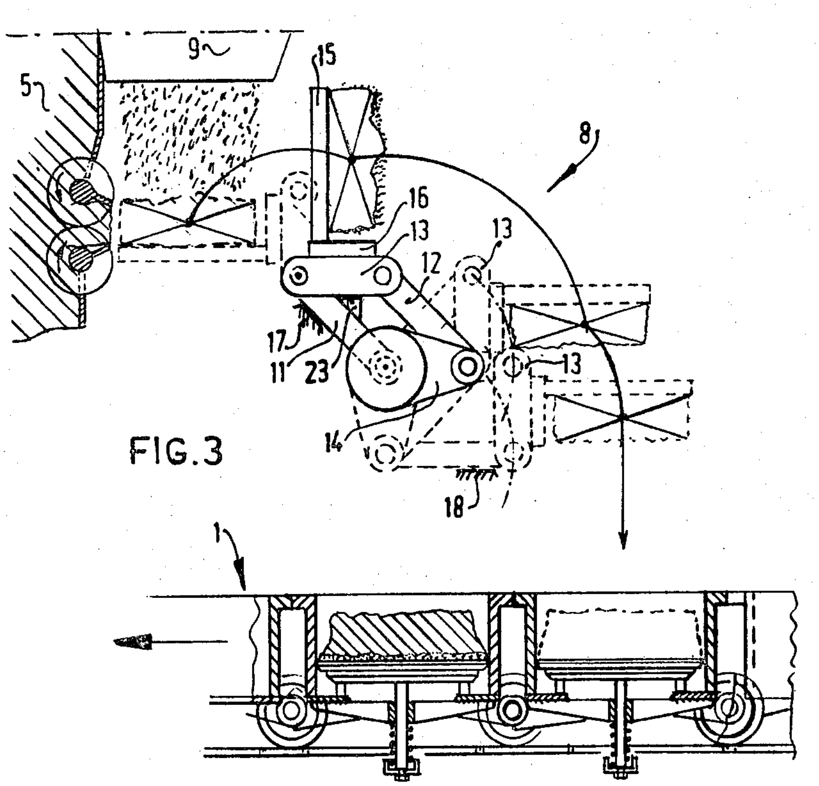
Figure 4:
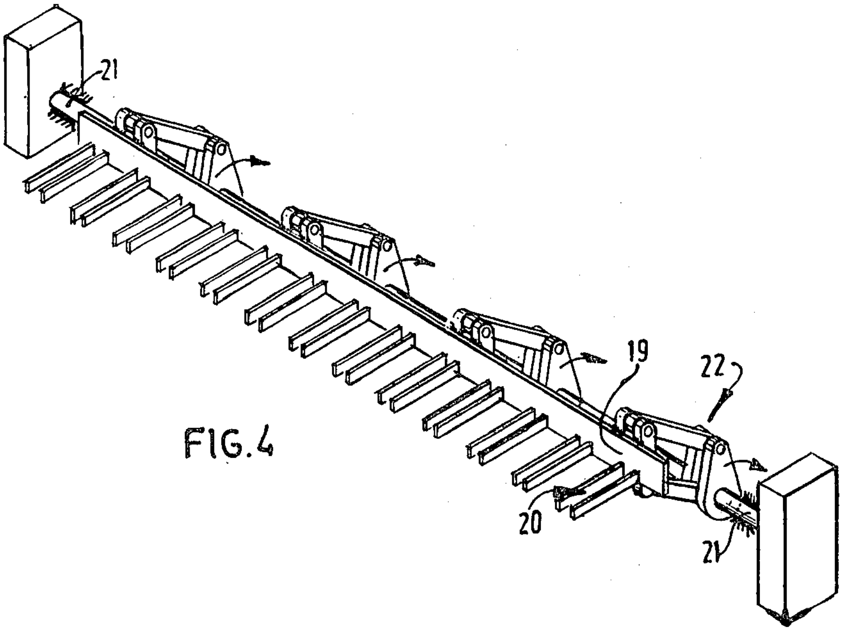

The projecting mechanism according to the invention will be described more fully with reference to FIGS. 2 and 3. The projecting mechanism comprises a parallelogram-shaped rod system, whose long sides are designated by 11 and 12 and whose short sides by 13 and 14. The short side 14 is driven. With the short side 13 is connected the carrier surface 15, which is bounded by the upwardly extending wall 16. The long side 11 is supported in the starting position by the stop 17. The system operates as follows.

By driving the short side 14 through about 90°, the carrier surface 15 performs a pivotal movement through 90°, the radius of this movement being equal to the length of the short side 13. The pivotal movement terminates when the short side 13 abuts against the stop 23 on the long side 11. The blank then occupies a substantially vertical position. Subsequently the entire parrallelogram performs a circular movement, the radius of which is equal to the length of the long sides. When the short side 14 is in a substantially vertical position in downward direction, the parallelogram is deformed into a rectangle. The movement of the long side 12 is limited by the stop 18. Thanks to the deformation of the parallelogram into a rectangle, the carrier surface remains in a substantially horizontal position and hence the boundary wall 16 remains in a substantially vertical position. Consequently during this critical part of movement, the blank is accurately controlled.

In one embodiment (see FIG. 4) various carrier surfaces, for example twenty, are supported by a single supporting beam 19. At equal intervals the beam 19 is provided with parallelogram-shaped rod systems according to the invention, for example 22, driven by a driving shaft 21.

What we claim is:

1. A device for receiving a mass of clay which is to be formed into a brick and for depositing it accurately in a molding tray, said device comprising:

a carrier member providing a carrier surface; and mechanism operative to move said carrier member from a position in which said carrier surface is upwardly facing to a final position in which said carrier surface is downwardly facing and in registry above a molding tray, said mechanism including means for placing said carrier surface in a first downwardly facing position substantially in registry above the mold tray prior to attaining said final position and for thereafter guiding said carrier member arcuately downwardly to said final position whereby the mass of clay is subjected principally to a vertically downward impetus into accurate reception within the molding tray.

2. A device as defined in claim 1 wherein said means comprises a linkage system which permits said carrier member to move by gravity from said first downwardly facing position to said final position.

3. A device as defined in claim 2 wherein said means includes a stop which constrains said linkage system as said carrier surface moves to said first downwardly facing position and thereafter releases the linkage system to permit said carrier member to move by gravity to said final position.

4. A device as defined in claim 3 including a further stop for terminating movement of said carrier member at said final position.

5. A device as defined in any one of claims 2–4 including a first stop which constrains part of said linkage system so that said carrier surface is moved initially from said upwardly facing position to a laterally facing position prior to attainment of said first downwardly facing position.

6. A device as defined in claim 5 wherein said means comprises a common drive shaft, there being a plurality of said linkage systems actuated in unison by said common drive shaft, each having a carrier member associated therewith.

7. A device as defined in any one of claims 2–4 wherein said means comprises a common drive shaft, there being a plurality of said linkage systems actuated in unison by said common drive shaft, each having a carrier member associated therewith.

8. A device as defined in any one of claims 2–4 wherein said linkage system is a parallelogram linkage.

9. A device as defined in claim 6 wherein said linkage system is a parallelogram linkage.

10. A device as defined in claim 7 wherein said linkage system is a parallelogram linkage.

11. A device for receiving a mass of clay and then transferring it to an associated molding tray without imparting to the mass of clay any substantial component of impetus as would tend to cause the mass to misregister with the associated molding tray, said device comprising:

a carrier member defining a carrier surface; and mechanism for moving said carrier member along an arcuate path from an initial position in which said carrier surface is upwardly facing to a final position in which said carrier surface is downwardly facing and in registry above the associated molding tray, said mechanism including means for causing said carrier member to pivot relative to said arcuate path as the carrier member moves to said final position.

12. A device as defined in claim 11 wherein said arcuate path is a series of arcs having different radii.

13. A device as defined in claim 11 wherein said carrier surface is moved into a first downwardly facing position prior to attainment of said final position and said means is operative from said first downwardly facing position to said final position.

14. A device as defined in any one of claims 11–13 wherein said means comprises a linkage system which permits said carrier member to move by gravity from said first downwardly facing position to said final position.

15. A device ad defined in claim 14 wherein said means includes a stop which constrains said linkage system as said carrier surface moves to said first downwardly facing position and thereafter releases the linkage system to permit said carrier member to move by gravity to said final position.

16. A device as defined in claim 15 including a further stop for terminating movement of said carrier member at said final position.

17. A device as defined in claim 14 including a first stop which constrains part of said linkage system so that said carrier surface is moved initially from said upwardly facing position to a laterally facing position prior to attainment of said first downwardly facing position.

18. A device as defined in claim 15 including a first stop which constrains part of said linkage system so that said carrier surface is moved initially from said upwardly facing position to a laterally facing position prior to attainment of said first downwardly facing position.

19. A device as defined in claim 16 including a first stop which constrains part of said linkage system so that said carrier surface is moved initially from said upwardly facing position to a laterally facing position prior to attainment of said first downwardly facing position.

20. A device as defined in claim 14 wherein said means comprises a common drive shaft, there being a plurality of said linkage systems actuated in unison by said common drive shaft, each having a carrier member associated therewith.

* * * * *